Oct. 20, 1931.    L. BERGER    1,827,928
ADJUSTABLE SEAT
Filed July 23, 1928    2 Sheets-Sheet 1
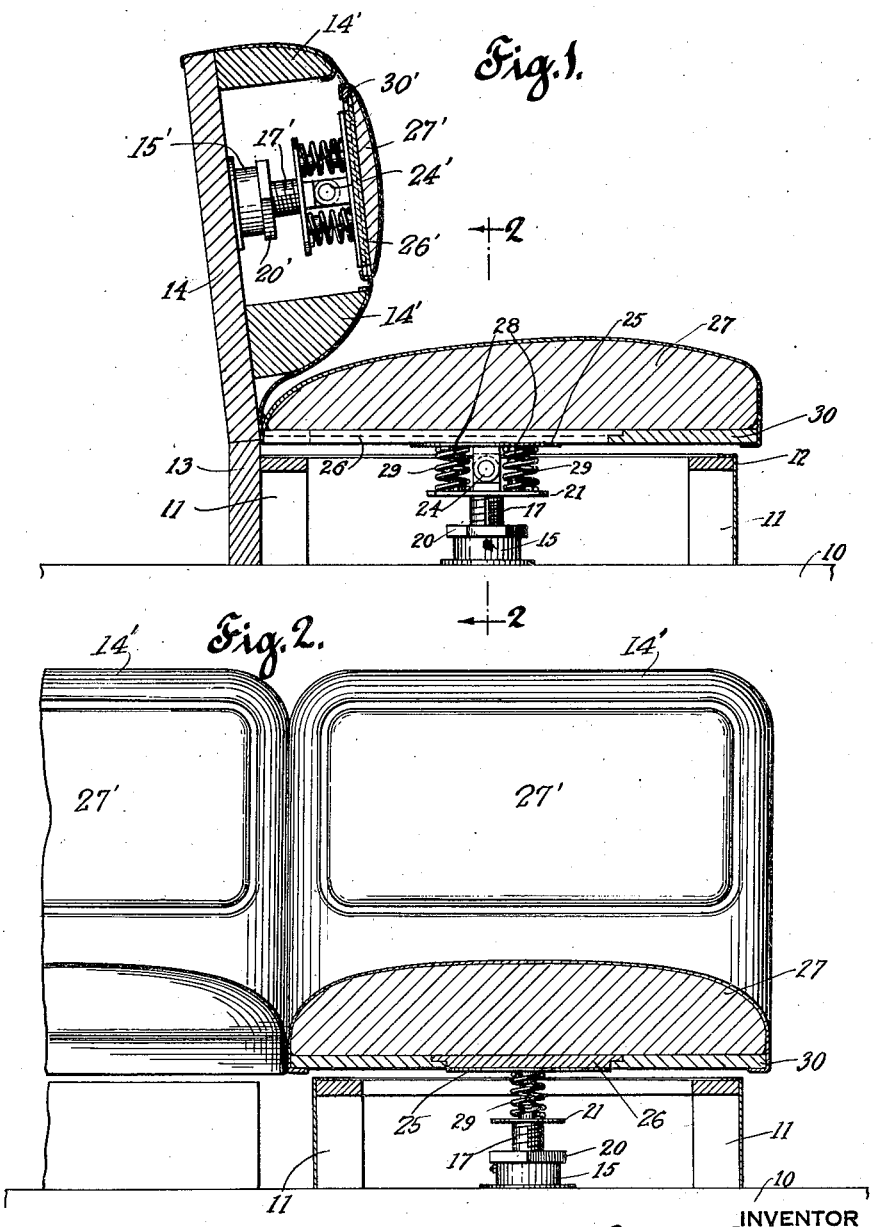
INVENTOR
Louis Berger
BY
ATTORNEY Oct. 20, 1931.　　L. BERGER　　1,827,928
ADJUSTABLE SEAT
Filed July 23, 1928　　2 Sheets-Sheet 2
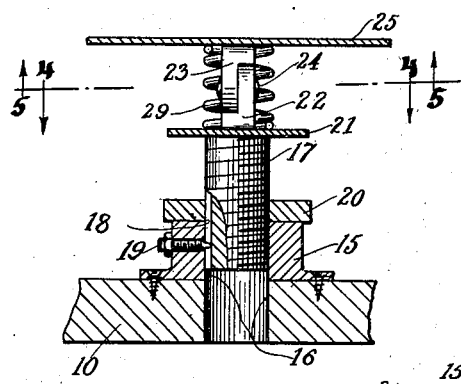
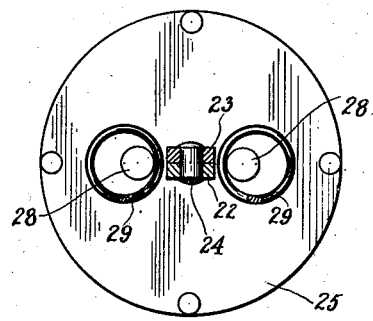
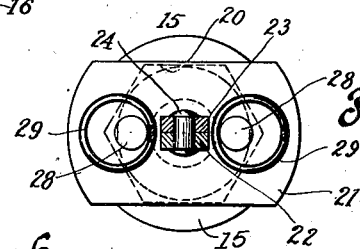
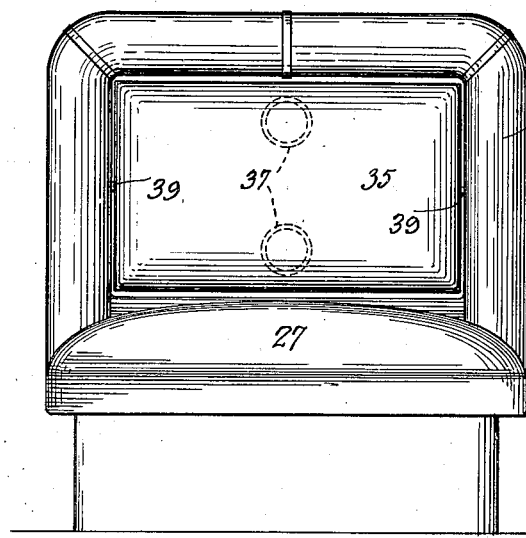
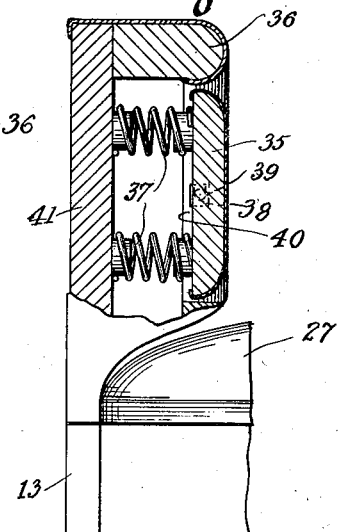
INVENTOR
Louis Berger
BY
ATTORNEY Patented Oct. 20, 1931

1,827,928

UNITED STATES PATENT OFFICE

LOUIS BERGER, OF JAMAICA, NEW YORK

ADJUSTABLE SEAT

Application filed July 23, 1928. Serial No. 294,807.

This invention relates to spring cushion seats of a general nature, and more particularly to types adaptable for use in automobile vehicles to give greater comfort to the operator or other occupants.

As arranged such seats are stiff, non-adjustable, do not posses resiliency, are not tiltable and, due to their construction, tiresome in the extreme, particularly so when the operator must drive the car on a protracted trip.

It is therefore one of the objects of the present invention to provide a seat, yieldingly mounted upon a pivot in such manner as to be capable of a moderate rocking movement upon demand, rendering it unusually comfortable, a similar device being incorporated in the seat back.

A further feature is in the provision of means permitting the seat cushion to slide limitedly forward should an abrupt stop occur to the vehicle, the cushion thereafter returning to its normal initial position, also the back cushion is arranged to move up and down slightly, such movements being further conducive to comfort of the user in permitting him to shift his position forth and back at will.

These and other advantageous objects are accomplished by the novel construction and arrangement of parts as hereinafter described and shown in the annexed drawings, forming part of this disclosure, and in which:

Figure 1 is a transverse sectional view of a seat made in accordance with the invention.

Figure 2 is a cross sectional view on a line 2—2 of Figure 1, showing part of the seat adjustment.

Figure 3 is an enlarged sectional view of the adjusting mechanism.

Figure 4 is a transverse sectional view taken on line 4—4 of Figure 3.

Figure 5 is a similar sectional view looking down on the same line.

Figure 6 is a front elevational view showing a modified form of seat back construction.

Figure 7 is a partial transverse sectional view taken on the center line of the same.

As shown in Figures 1, 2, and 3, a flooring 10 has secured upon it four legs 11 carrying a rectangular frame 12 and at the rear is a back support 13 having a rearwardly inclined upper portion 14.

Attached to the floor 10, centrally of the legs 11, is a base 15 having a central bore 16 in which is slidably engaged a plunger 17, having a key-way 18 to receive the point of a screw 19 to prevent turning of the plunger.

The plunger is threaded at its lower portion to engage a nut 20 by which the plunger may be raised and lowered as required.

Carried at the top of the plunger 17 is a plate 21 having flattened sides and extending upwards, centrally of the plate is a lug 22 shouldered at its upper end to engage a lug 23 similarly shouldered and connected by a headed pin 24 to act as the pivot of a hinge or knuckle joint.

The lug 23 is fixed centrally on the bottom of a circular plate 25 secured on the underside of a plate 26 constituting part of the bottom of a cushioned seat rest 27 of any preferred size and type.

From the foregoing it will be seen that the cushioned seat rest is rockingly mounted on the plunger and may be adjusted in height relative to the seat frame.

In order to provide a desirable resilience to the cushioned seat rest 27 a pair of posts 28 are set in the plate 21, at the front and rear of the knuckle joint, these posts being eccentrically encircled by coiled compression springs 29.

The cushioned back rest is provided throughout with similar elements which for the sake of simplicity have been given prime numbers.

The cushioned seat rest 27 of the seat is provided with side and front plates 30 having inner, under-cut edges to engage the central plate 26 and permit the cushioned seat rest to slide forward upon occasion, as an abrupt stop of the vehicle, or when the user desires to shift his position, and is easily pressed back at will. The back rest is also provided with similar elements to permit it to be raised or lowered at will within the margins of a circumambient frame 14'.

In the modification shown in Figures 6 and 7 the cushioned back rest 35 is enframed at its top and sides by outstanding members 36, and disposed between the back support 41 and back rest 35 are two compression springs 37, the back rest being removably attached by a central hook element 38 engaging a pin 39 set in a backing plate 40, thus giving a resilient effect to the back rest and permitting the same to tilt moderately.

As the operator of the car adjusts himself so as to obtain a maximum of comfort, the seat and back rests may slide and tilt on the axis of the transverse pins 24 and 24'. This is caused by the weight of the operator pressing upon the seat and back which swings on the pins 24 and 24', pressing upon the springs 29 and 29', which, responding to the pressure on either side, provides a desirable degree of resiliency.

From the foregoing it will be seen that a simple device for this purpose has been disclosed in the preferred forms of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. An automobile seat comprising in combination a flooring, a frame secured to the flooring, a base attached to the flooring centrally of the frame, said base being provided with a central bore, a threaded plunger adapted to slide within the bore, co-acting means on the base and plunger for preventing rotation of the plunger, a rotatably free internally threaded element engaging the threaded portion of the plunger by which the plunger may be raised or lowered a plate seated on the plunger provided with an upwardly-extending lug, a second plate provided with a depending lug, said lugs being in pivotal engagement with each other, compression springs supported on the first mentioned plate forwardly and rearwardly of the lugs, and a seat rest provided with side portions in slidable engagement with said second plate.

2. An automobile seat comprising in combination a flooring, a frame secured to the flooring, a base attached to the flooring centrally of the frame, said base being provided with a central bore, a threaded plunger adapted to slide within the bore, co-acting means on the base and plunger for preventing rotation of the plunger, a rotatably free internally threaded element engaging the threaded portion of the plunger by which the plunger may be raised and lowered, a plate seated on the plunger provided with an upwardly-extending lug, a second plate provided with a depending lug, said lugs being in pivotal engagement with each other, compression springs supported on the first mentioned plate forwardly and rearwardly of the lugs, a seat rest provided with side portions in slidable engagement with said second plate, a back support, a back rest, means to permit the back rest to be tilted, and compression springs disposed between the back support and back rest whereby to lend resiliency to the back rest.

3. An automobile seat comprising in combination a flooring, a rectangular frame, legs secured to the flooring and adapted to carry the rectangular frame, a base attached to the flooring centrally of the legs, said base being provided with a central bore, an internally-threaded element positioned above the base, a threaded plunger engaging the threaded element and adapted to slide within the bore, co-acting means on the base and plunger for preventing rotation of the plunger, a plate seated on the plunger, a lug extending upward centrally of the plate, a second plate, a lug depending centrally of the latter plate, said lugs having shouldered portions in pivotal engagement with each other, spaced posts disposed at the front and rear of the lugs, compression springs encircling the posts, a seat rest having a bottom, said bottom having a middle portion secured to the second plate and side portions in slidable engagement therewith, a back support, a back rest, means to permit the back rest to be tilted, and compression springs disposed between the back support and back rest whereby to lend resiliency to the back rest.

In testimony whereof I have affixed my signature.

LOUIS BERGER.